July 28, 1931.   J. W. PIPPIN   1,816,693
AUTOMATIC TIRE INFLATION MECHANISM
Filed Sept. 15, 1928   2 Sheets-Sheet 1
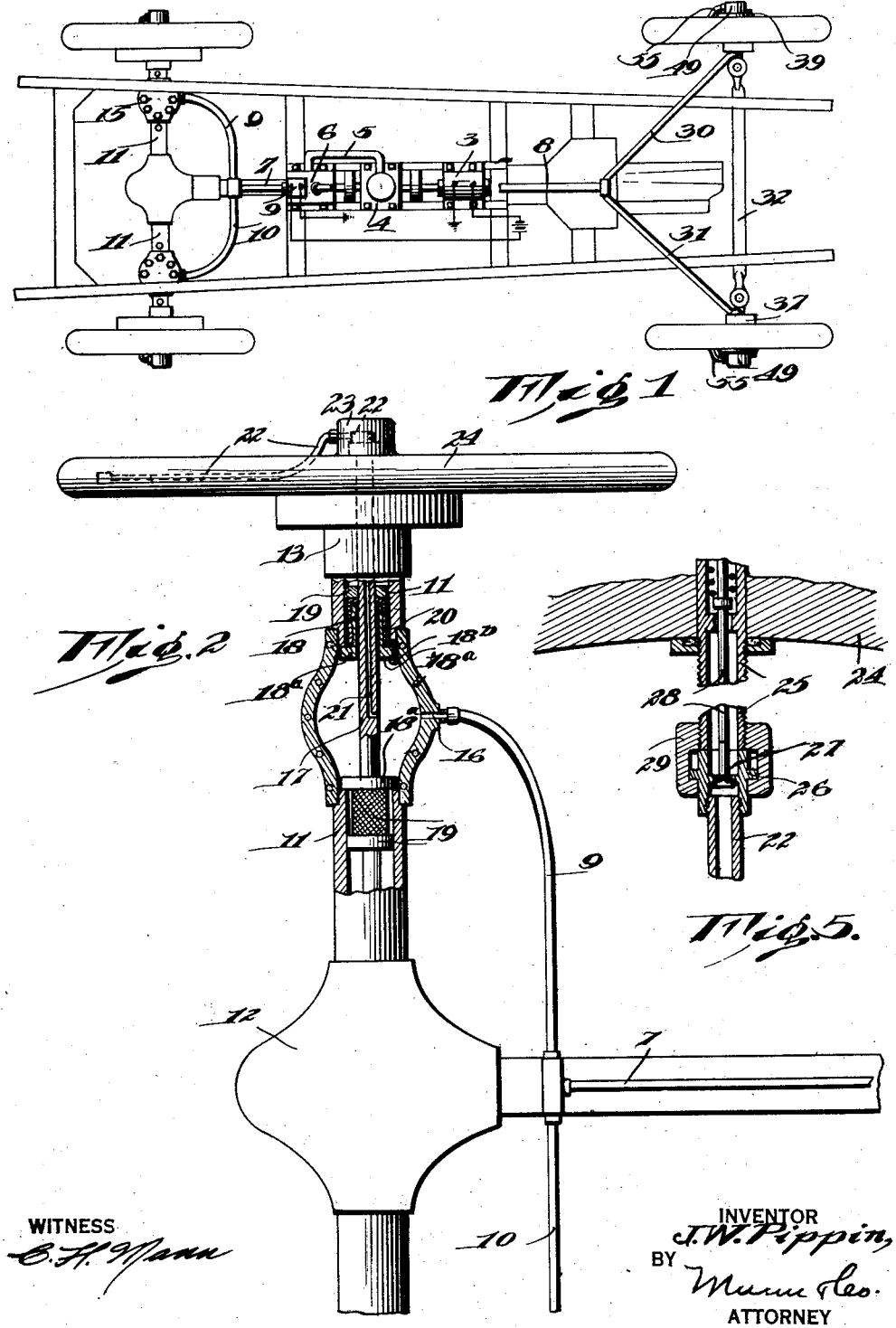
WITNESS
INVENTOR
J. W. Pippin,
BY
ATTORNEY July 28, 1931. J. W. PIPPIN 1,816,693
AUTOMATIC TIRE INFLATION MECHANISM
Filed Sept. 15, 1928 2 Sheets-Sheet 2
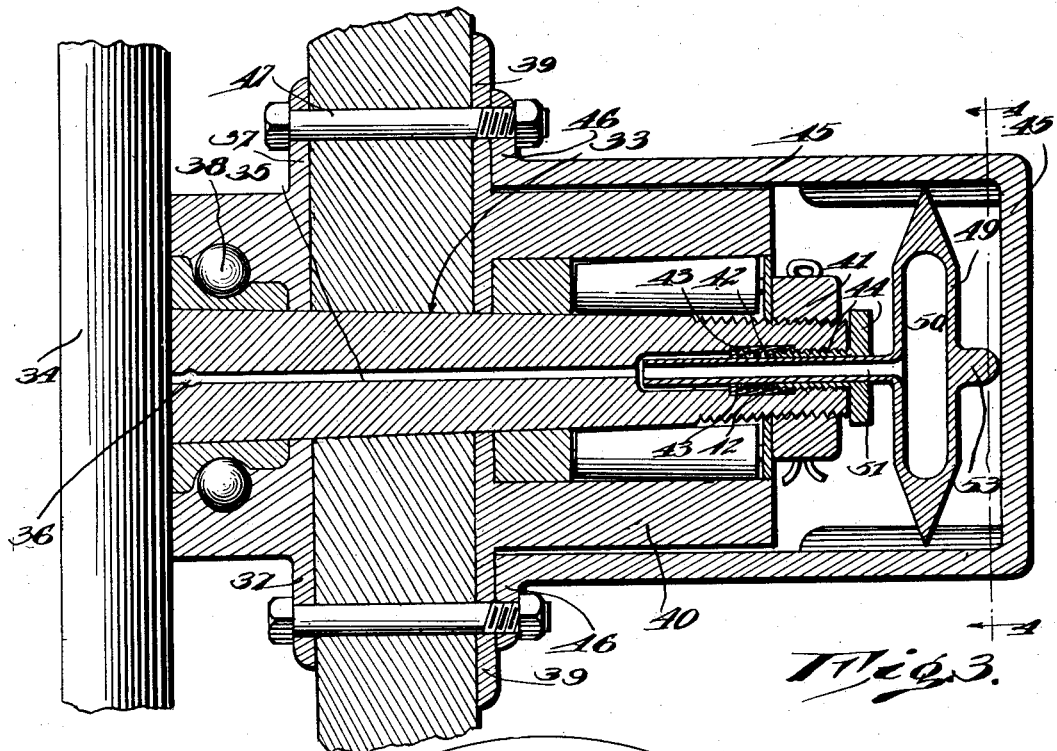
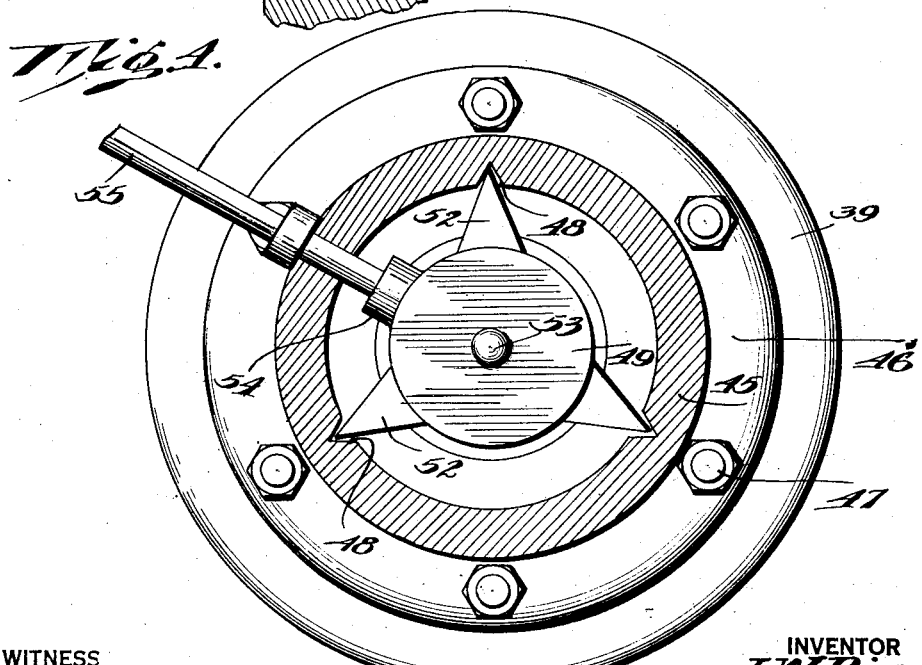
WITNESS
C. H. Mann
INVENTOR
J. W. Pippin,
BY Munn & Co.
ATTORNEY Patented July 28, 1931

1,816,693

UNITED STATES PATENT OFFICE

JOHN W. PIPPIN, OF HEBBRONVILLE, TEXAS

AUTOMATIC TIRE INFLATION MECHANISM

Application filed September 15, 1928. Serial No. 306,201.

This invention relates to pneumatic tired vehicles, and particularly motor vehicles, and is more particularly concerned with mechanism forming part of the permanent equipment of the vehicle and operative to supply and maintain air under pressure to the pneumatic tires thereof whether the vehicle is moving or stationary. Aside from the convenience of such equipment, the maintenance of proper inflation pressure in the tire casings is essential to secure maximum wear. Furthermore, maintenance of inflation pressure enables the continued driving of a car having a tire puncture producing a slow leak until such time as it is convenient to stop for repairs and prevents damage to the side walls of the tire casing and to the inner tube by the movement of the vehicle with partly deflated tire for even short distances.

My invention contemplates the use, as part of the inflation equipment, of a small electric motor driven compressor and preferably an associated storage tank with automatic pressure control for the motor which may be powered from the battery or generator of the motor vehicle. The automatic control will be set for a predetermined inflation pressure to be maintained, and the compressor or its storage tank, is placed by permanently open air line conduits in communication with the inner tubes of the tires, and reduction in pressure in a tire below the desired point will automatically cut in the motor and attainment of the desired inflation pressure will serve automatically to open the motor circuit. Such compressor equipment and control is well known and any standard construction of this type may be employed.

The air under pressure is carried to the pneumatic tires of the vehicle by flexible conduits to the rear axle housings and to the front wheel spindles which are of special and novel construction to house and provide air conduits extending to the outer ends of the axles and spindles and communicating by conduits rotating with the wheels with the inner tube valves maintaining said valves open so that the air pressure therein may at all times react through the conduits to register with and operate the automatic compresser control hereinbefore referred to.

The invention consists in the construction, combinations and arrangements of parts hereinafter described and claimed and the foregoing and other features and advantages of the invention are pointed out in detail in the following specification which is to be read in conjunction with the accompanying drawings forming part thereof and in which:—

Figure 1 is a top plan view of the chassis of a motor vehicle embodying the tire inflation equipment of the present invention.

Figure 2 is a top plan view, partly in section, and on an enlarged scale, of the rear end construction at one side of the differential, showing the air chamber formed in the axle housing and the air duct through the axle to its wheel end.

Figure 3 is a vertical section on an enlarged scale through one of the front wheel spindles and wheel hub.

Figure 4 is a transverse vertical section through the hub cap on the line 4—4 of Figure 3 showing the compensating connection between the wheel hub and the air take off member on the spindle end providing for the maintenance of air connection through the spindle despite relative longitudinal bodily movement of the wheel thereon through wear.

Figure 5 is a vertical sectional view of a typical standard valve-opening connection between an air conduit and a tire inflation valve.

As previously stated, any standard form of motor driven air compressor with automatic pressure control for the motor may be employed. In the drawings, I have shown diagrammatically, a longitudinal supporting frame extending between cross members 2 of the chassis frame of a motor vehicle and mounting an electric motor 3 coupled to a compressor 4 which is connected by a conduit 5 to a storage tank 6 from which flexible trunk conduits 7 and 8 run towards the rear and front ends, respectively, of the chassis. A suitable pressure controlled switch, generally shown and designated at 9, is mounted on and communicat... with tank 6 and is interposed in the motor circuit as diagrammatically shown. The specific form of control switch is immaterial and any of the standard forms of pressure controlled cut-outs, so called, now used on motor driven compressors may be used. The source of electric energy for the motor may be the electric storage battery of the motor vehicle.

The trunk air conduit 7 at its rear end divides into flexible branch conduits 9 and 10 which in turn communicate with air chambers formed in the rear axle housings 11. Since the construction of housing, axle shaft and air passages etc. is identical for both right and left housings, only one housing is shown and described in detail.

Referring to Figures 1 and 2, it will be seen that the left rear axle housing 11 extending between the differential case 12 and the left rear wheel hub 13 is made in two sections spaced by an enlarged tubular casing 14 having its opposite ends welded on the adjacent ends of the sections of the housing 11. This casing is provided with a top inspection and access plate 15 bolting thereto and in air tight engagement with its edges. The front portion of the casing is formed with an air intake opening 16 into which the rear end of the branch conduit 9 is securely fitted. The interior of the housing sections 11 adjacent to the connected ends of the casing 14 are internally threaded and engaged by the threaded peripheral face of closing disks 19 centrally bored to permit the passage of the axle shaft 17 therethrough, the openings around said bores being closed and made air tight by capped sleeve packing 20 into which packing glands 18 thread and by which glands the packing is held against the disks 19 at the shaft bores to make the casing 14 air tight. The heads 18a of the glands 18 will, when the glands are threaded into the sleeved packing 20, abut the ends of the axle housing 11 and may be secured thereto against reverse loosening rotation by suitable means such as pins 18b. The packing sleeves are formed with external oil grooves therein to prevent excessive wear and "burning out." The axle shaft from a point midway of the length of casing 14 to the outer end of the shaft is drilled to provide an air passage 21 extending longitudinally thereof and turned at its inner end to exit at the periphery of the shaft and communicate with the interior of the air chamber formed by the casing 14. At the outer end of the axle shaft an air conduit pipe 22 is tightly fitted into the outer end of the air passage 21 and extends through the hub cap 23 and is thence bent sharply inward to lie within the plane of the wheel 24, extending to the inflation valve stem 25 of its tire to which it is coupled by standard fittings as shown in Figure 5, its metal nozzle 26 having a plunger 27 engaging and depressing the valve stem 28 to open the inflation valve. The coupling sleeve 29 on this head maintains the tube 22 coupled to the inflation valve stem with its valve open to place the inner tube of the tire in permanent communication with the air passage 21, air chamber 14, conduit 9, trunk 7 and storage tank 6. A leak causing appreciable reduction of the inflation pressure of the tire will, therefore, react by reduction of pressure in the tank 6 to operate the switch 9 to cut in the circuit of the electric air compressor motor to bring the tire inflation pressure up to normal when the motor is automatically cut out of circuit by the pressure controlled switch in the usual manner. Continuous operation of the motor and pump will indicate a puncture or leak of serious proportions requiring immediate attention.

At its forward end, the front trunk air conduit 8 diverges into two branch conduits 30 and 31 which communicate with the inflation valves of the front tires through the following constructions and connections identical for each wheel and spindle. From Figure 1 of the drawings, it will be seen that these conduits extend to the spindles upon which the front wheels are mounted for rotation, these spindles being mounted in the usual manner at the ends of the front axle 32.

Referring particularly to Figures 3 and 4, it will be seen that the wheel spindle 33 of the usual tapering form extending outwardly from the axle mounted spindle body 34 is drilled longitudinally to its outer end to provide a longitudinal air passage 35 having a counter bore 36 at its inner end adjacent to the spindle body 34 into which the front end of a branch air conduit 30 or 31 is tightly fitted. The inner half 37 of the sectional wheel hub is mounted on the spindle 33 through a ball bearing 38 of standard form. The outer half 39 of the hub carries a sleeve 40 within which are mounted roller bearings of standard construction. The threaded outer end of the spindle 33 projects out beyond this sleeve and its roller bearing and is engaged as usual by an axle nut 41 cross cottered to the spindle at the side of the air passage therethrough. This air passage 35 at the outer end of the spindle is of substantially increased diameter, is threaded at its outer end and formed with an intermediate packing groove 42 into which sleeve packing 43 is forced and held by a packing gland 44 threading into the end of the air passage.

The sleeve 40 of the outer hub section 39 is enclosed by a tubular hub cap 45 outstanding therefrom and having an edge flange 46 at its inner end through which the hub bolts 47 extend. The interior of the cap 45 beyond the sleeve 40 is formed with a plurality of longitudinal circumferentially spaced grooves 48.

A disk-like member 49 having an internal air chamber 50 and a communicating axial tubular extension 51, is provided with radially outstanding projections 52 seating in said grooves and connecting said member with the hub cap and hub for rotation therewith and with the wheel whose hub is clamped between the plates of the hub sections 37 and 39 by the hub bolts 47.

The tubular extension or stem 51 of the chambered member 49 fits snugly through the bore of gland 44 and through the sleeve packing 43 which provides an air tight packing in the air passage around the stem 51. It is held in said bore and the chambered disk 49 is prevented from bodily movement lengthwise outwardly by air pressure through a nub 53 projecting axially outward from its outer face and engaging the inner face of the hub cap. Obviously, as wear occurs in the hub bearings and the wheel has a tendency to move longitudinally on its spindle or "wobble," the grooves 48 and projections 52 provide for this relative movement between wheel hub and the chambered member 49 without destroying their rotative connection.

The member 49 between its projections is topped and formed with a boss 54 into which is fitted tightly the inner end of an air conduit tube which is bent inwardly to be within the plane of the wheel and connected at its outer end with the inflation valve of the tire, as shown in Figure 5, to place the inner tube in permanent communication with the air passage running through the spindle and thence to the air tank 6. Loss of inflation pressure in a front tire will, therefore, react through the reduction in pressure in the air tank 6 automatically to close the circuit of the compressor motor to increase the inflation pressure as needed.

The described equipment therefore constitutes a complete tire inflation unit automatic in action and effective to maintain inflation pressure of the vehicle tires whether the vehicle is moving or stationary. While the structural features described represent a preferable embodiment of the invention, they are intended as illustrative rather than restrictive, and structural changes may be effected to adapt the invention to different conditions of manufacture and vehicle construction in consonance with the spirit of the invention and the scope of the appended claim.

What I claim therefore and desire to secure by Letters Patent is:

In a device for inflating the pneumatic tires of wheeled vehicles, a spindle mounting a pneumatic-tired wheel and having a longitudinal air passage therethrough to its outer end enlarged in diameter at said outer end, a wheel hub having a housing portion capping and enclosing the outer end of said spindle and having a plurality of grooves therein extending in a direction longitudinally of the spindle, a chambered disk-like member having projections fitting in said grooves for rotation of said member with the wheel and for relative longitudinal sliding movement of wheel and member, the latter having a tubular extension journaled in the enlarged outer end of said spindle air passage, a packing gland between said tubular extension and the walls of the enlarged air passage providing an air-tight joint, and an air conduit extending from the chamber of said disk-like member to the inflation valve of said tire having means thereon to engage and open said valve.

JOHN W. PIPPIN.